United States Patent [19]

Willard

[11] Patent Number: 4,623,550
[45] Date of Patent: * Nov. 18, 1986

[54] METHOD FOR PREPARING SHEETED FRIED SNACK PRODUCTS FROM CORN AND OTHER CEREAL FLOURS

[76] Inventor: Miles J. Willard, P.O. Box 1747, Idaho Falls, Id. 83401

[ * ] Notice: The portion of the term of this patent subsequent to Nov. 18, 2003 has been disclaimed.

[21] Appl. No.: 820,830

[22] Filed: Jan. 21, 1986

Related U.S. Application Data

[63] Continuation of Ser. No. 732,910, May 9, 1985, abandoned, which is a continuation of Ser. No. 614,382, May 24, 1984, abandoned, which is a continuation of Ser. No. 384,897, Jun. 4, 1982, abandoned.

[51] Int. Cl.$^4$ ............................................. A21D 10/00
[52] U.S. Cl. ....................... 426/559; 426/440; 426/560; 426/808
[58] Field of Search .............. 426/549, 559, 560, 622, 426/625, 653, 661, 440, 446, 502, 450, 503, 808

[56] References Cited

U.S. PATENT DOCUMENTS

| | | | |
|---|---|---|---|
| 2,919,986 | 1/1960 | Johnson | 426/559 |
| 2,954,296 | 9/1960 | Clavsi et al. | 426/559 |
| 3,246,990 | 4/1966 | Thompson et al. | 426/559 X |
| 3,447,931 | 6/1969 | Benson et al. | 426/559 |
| 3,462,276 | 8/1969 | Benson | 426/440 X |
| 3,499,766 | 3/1970 | Vollink et al. | 426/446 X |
| 3,600,193 | 8/1971 | Glabe et al. | 426/808 X |
| 3,703,378 | 11/1972 | Bretch | 426/559 X |
| 3,922,370 | 11/1975 | Prakash | 426/440 X |
| 3,968,265 | 7/1976 | Shatila et al. | 426/808 X |
| 3,997,684 | 12/1976 | Willard | 426/559 X |

*Primary Examiner*—Arthur L. Corbin
*Attorney, Agent, or Firm*—Christie, Parker & Hale

[57] ABSTRACT

An expanded fried cereal-based snack product is prepared from a dough consisting essentially of (1) a low water-absorbing component (LOWAC) comprising one or more raw or partially gelatinized cereal flours comprising about 20% to about 80%, by weight, of the total dry solids; (2) a high water-absorbing component (HIWAC) comprising one or more pregelatinized cereal starches or flours comprising from about 10% to about 35%, by weight, of the total dry solids; and (3) a starch component comprising one or more ungelatinized starches comprising from about 10% to about 45%, by weight, of the total dry solids. The dry solids are mixed with water to form a dough having a moisture content from about 35% to about 50% by weight of the dough. The dough is then sheeted and cut into a dough piece which is fried in hot cooking oil to form a fried snack that expands about 1.4 to about 2.5 times during frying, producing a snack of uniform expansion and low fat content.

24 Claims, 1 Drawing Figure

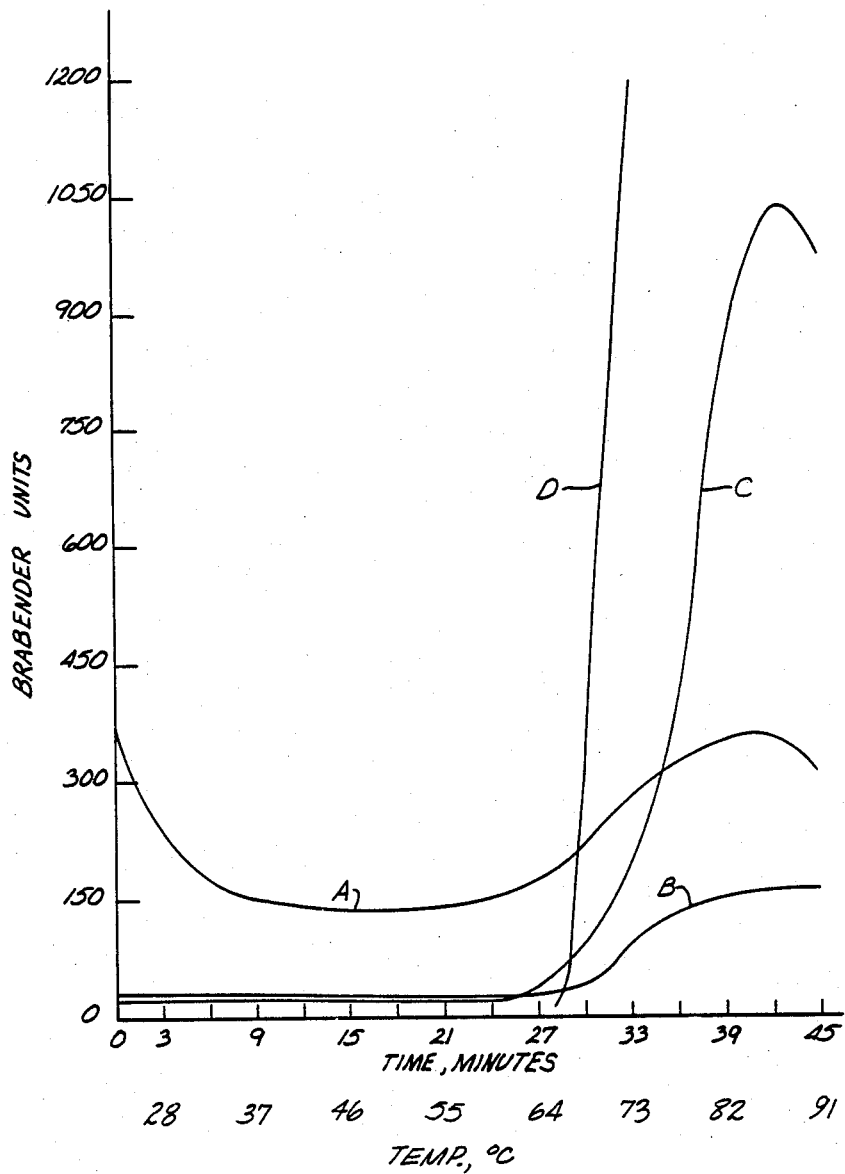

METHOD FOR PREPARING SHEETED FRIED SNACK PRODUCTS FROM CORN AND OTHER CEREAL FLOURS

CROSS-REFERENCE TO RELATED APPLICATIONS

This is a continuation of application Ser. No. 732,910, filed May 9, 1985, now abandoned, which is a continuation of application Ser. No. 614,382 filed May 24, 1984, now abandoned, which is a continuation of application Ser. No. 384,897, filed June 4, 1982, now abandoned.

BACKGROUND OF THE INVENTION

1. Field of the Invention

This invention relates to a process for making fried snack products from mixtures of precooked and raw flours made from cereal grains such as corn, wheat, oats, rye, barley, rice, and the like. One practice of the invention is particularly suitable for making sheeted snack products from dry milled corn flours.

2. Description of the Prior Art

Traditional fried corn snacks are made from whole kernel corn that has been steeped in a hot lime solution to soften the outer hull and partially gelatinize the starch in the endosperm. The treated grains are washed to remove the softened hull and ground to form a plastic dough containing about 50% moisture, known as masa. The freshly-ground masa is sheeted between rollers, cut into pieces, and baked to reduce the moisture content from about 35% to as low as about 20% before frying, as described in U.S. Pat. No. 905,559 to Anderson et al and U.S. Pat. No. 3,690,895 to Amadon et al. The dough should have a moisture content of about 50% for effective sheeting, but frying a sheeted corn-based dough with 50% moisture typically causes undesirable puffing of the fried product. As a result of the reduced moisture content of the baked dough pieces, the fat content of the fried product is about 20% to 25%. However, the fried pieces tend to have an uneven expansion, with large blistered areas and a hard, chewy texture. It appears that areas of non-uniform structure in the fried masa-based snacks may be caused by non-uniform composition of the masa dough, namely, areas of undercooked corn particles, resulting in non-expanded sections of the fried snack.

All such conventional sheeted corn snacks have the characteristic flavor of lime-soaked corn as a result of residual lime and the by-products from its reaction with corn constituents.

Dried masa flour is also available for the manufacture of corn snacks and other Mexican food specialties, such as tortillas and taco shells. In typical processes for making such dried masa flour, described in U.S. Pat. No. 4,344,366 to Garza; U.S. Pat. No. 2,704,257 to Diez De Sollano et al; and U.S. Pat. No. 3,369,908 to Gonzales et al, the lime-treated corn is ground and dehydrated to a stable form. The dried masa flour can be later rehydrated with water to form a dough for extrusion or sheeting.

Partially cooked, dry-milled whole corn flours are also made from whole corn kernels, as in the methods described in U.S. Pat. No. 3,404,986 to Wimmer et al and U.S. Pat. No. 4,089,259 to Stickle et al. The corn in these methods is gelatinized without lime treatment, i.e., without removing the outer hull. These whole corn flours can be mixed with water to form a dough for making a fried snack. Fried sheeted snacks made from these whole corn flours and masa flour are hard and brittle and retain too much fat, probably because of the low water absorption of the flours. The same is true for other cereal grains, which otherwise have potential for use as novel, nutritious, economical fried snack products. Such cereal grains include precooked wheat, known as bulgur, steam-rolled grains, such as oats and rye, precooked barley, and rice. These cereal grains can be milled into flours and mixed with water to form a dough. However, dough pieces made from such grains do not expand when fried to form a desirable porous texture; but instead they form a non-porous, flinty product that is undesirable as a snack food.

It would be desirable to produce fried snacks from mixtures of dry cereal ingredients not normally used for snack foods to form fried snack products which are well expanded with uniform porosity, are not brittle and have acceptable fat content. It would be particularly desirable to produce corn snacks and other cereal grain snacks that can be extruded and fried at moisture levels above 40%, while avoiding intermediate treatment such as moisture content reduction before frying. It would be especially desirable to produce a sheeted fried corn snack with a characteristic full corn flavor from a variety of non-lime-treated dry corn products. The prior art has not suggested how to produce a corn-based fried snack with uniform porosity and expansion and reasonably low fat content. To produce fried snacks from corn processed by dry-milling avoids the more cumbersome and time-consuming process of preparing freshly-ground masa. It also can eliminate the stream pollution and the costly waste treatment facilities required when making snacks from lime-treated corn kernels.

The method of this invention provides sheeted fried corn snacks that overcome the problems described above. In addition, the method provides novel fried snack products made from cereal grains and flours heretofore not used for commercial snack foods.

SUMMARY OF THE INVENTION

Briefly, one embodiment of this invention provides a method for making an expanded cereal-based fried snack product, comprising the steps of preparing a dough from dry solids consisting essentially of (a) one or more raw or partially gelatinized cereal flours providing a low water absorption component, as defined herein, comprising from about 20% to about 80%, by weight of the total dry solids; (b) one or more pregelatinized cereal starches or flours providing a high water absorption component, as defined herein, comprising from about 10% to about 35%, by weight of the total dry solids; and (c) a raw starch component comprising one or more ungelatinized starches comprising from about 10% to about 45%, by weight of the total dry solids in the dough. The dry solids are combined with water to form a moist, cohesive dough having a moisture content from about 35% to about 50%, by weight of the dough. A dough piece, formed by sheeting the dough and cutting a dough piece from the sheeted dough, is fried in hot cooking oil to form a uniformly expanded fried snack product that expands from about 1.4 to about 2.5 times its original thickness during the frying step.

The high water absorption component has a Modified Bostwick Index (M.B.I.), as defined herein, less than about 15 cm., normally about 12 cm. or less, where the M.B.I. is a convenient measurement of the water absorption of starch-containing materials at room temperature. The low water absorption component has an M.B.I. higher than about 20 cm., normally above 25 cm. Raw starches (and certain raw flours which can provide the starch component of this process) have essentially no water absorption at room temperatures and therefore have an essentially infinite M.B.I.

The combination of these three components in the dough piece at the time of frying is critical to this process. The low water absorbing cereal flour provides the necessary flavor, fiber and structure of the fried snack, but the low water absorbing component, in and of itself, will dehydrate too rapidly in the fryer and not form the desired snack structure. The high water absorbing component retains the water in the formed dough piece as the temperature increases during frying. At the gelatinization temperature, sufficient water is therefore present in the dough to allow the residual raw starch contained in the low water absorbing component and in the raw starch component to absorb water when the dough reaches the gelatinization temperature and gelatinize the residual raw starch. This controlled expansion forms the desired well expanded, uniformly porous fried snack.

The method is particularly useful in making corn-based snack products from a variety of dry-milled, non-lime-treated whole corn flours as well as from standard masa flours. The invention is also useful in making cereal based snacks from flavorful and healthful ingredients not previously used for snack products.

These and other aspects of the invention will be more fully understood by referring to the following detailed description and the accompanying drawing.

DRAWING

The drawing shows a series of graphs illustrating the relation between viscosity and cooking temperature or cooking time for a high water absorption component (A), a low water absorbing cereal component (B), a low water absorbing raw corn flour (C), and raw amioca starch (D).

DETAILED DESCRIPTION

This invention generally provides a method for making a fried, expanded cereal grain-based snack product by forming a dough from a combination of ingredients consisting essentially of (1) a low water absorption component comprising one or more low water absorptive, cereal flours for providing the flavor, appearance and fiber components of the snack; (2) a high water absorption component comprising one or more pregelatinized cereal starches or flours having a high water absorbing capacity; and (3) a raw starch component comprising one or more ungelatinized starches. The dry components are mixed with water to form a dough, and the dough is sheeted normally between two counter-rotating rollers. The sheeted dough is cut into pieces such as hexagons, triangles, rectangles, or the like. The sheeted dough pieces are then fried to form a uniformly expanded fried snack.

The high water absorption component has a selected water absorption range, such that when this component is combined in the desired ratio with the low water absorptive cereal flour, the raw starch and water, the sheeted pieces, when fried, expand within a controlled range. This produces a snack with a desirable expansion, uniform porosity and controlled absorption of fat. The dough pieces are fried in hot cooking oil immediately after forming by sheeting and cutting without any intermediate treatment that would appreciably alter their moisture content following sheeting and cutting to form the fried snack.

The degree of expansion of the dough piece during frying is controlled by the composition of the dough at the time of frying, and particularly at the time the components reach the gelatinization temperature, so that the dough piece expands with an expansion ratio generally in the range of from about 1.4 to about 2.5-to-1, i.e., the thickness of the finished product is from about 1.4 to about 2.5 times the thickness of the dough before frying. A fried product having an expansion ratio lower than the minimum desired expansion ratio of 1.2-to-1 generally is unacceptable because of its hard, horny consistency. In all cases, the finished product of the method has a uniformly porous or cellular interior structure, avoiding the uneven expansion and large blistered areas found in prior art products. For instance, the structure of these products is observably different from those disclosed in U.S. Pat. No. 3,886,291 to Willard, in which the extruded potato snack product has a porous internal structure encased in a dense exterior layer of substantially reduced porosity. The uniform expansion and structure of the product also differ from the fried corn chips commonly sold under the trademark.

According to one practice of this invention, novel corn-based fried snack products are produced from a variety of dry-milled, non-lime-treated corn ingredients. These fried products are produced from a variety of low water absorptive corn flours from which it has not previously been thought possible to produce expanded corn snacks with uniform porosity and expansion and with reasonably low fat content. In describing the invention with respect to such corn ingredients the following definitions are used.

"Whole corn flour" refers to corn flour having an approximate analysis similar to whole corn kernels, not treated with lime during processing, but subjected to sufficient heat treatment to partially gelatinize the starch contained in the kernel and inactivate the enzymes so that the final milled dried whole corn flour can be stored indefinitely without rancidity. It normally contains about 4.5% to 4.8% fat, 3.4% fiber, 10.8% protein, and 1.3% ash.

"Masa flour" is lime-treated partially cooked corn that has been dried and ground to a flour for use in Mexican foods and traditional corn snacks.

"Corn flour" is raw, dry-milled corn recovered from the endosperm (the starchy, low-fiber component) of the kernel during the conventional dry milling procedure. It typically contains about 1.0% to about 2.0% fat, 0.4% fiber, 6.7% protein, and 0.4% ash. Corn flour is sifted through a 60-mesh (250 micron) screen and has been subjected to no heat treatment during processing.

"Pregelatinized corn flour" is similar in composition to corn flour, except that the corn has been subjected to sufficient moist heat treatment during processing to gelatinize a portion of the starch, thereby increasing the water absorption of the flour. Pregelatinized corn flours are available in varied degrees of water absorption capacity and methods of manufacture.

Generally, the high water absorption component, abbreviated herein as "HIWAC", most generally comprises from about 10% to about 35%, by weight, of the total dry solids present in the dough. Optimum results are obtained when the HIWAC is present in the dough in the range from about 15% to about 25%, by weight, of the total dry solids. The purpose of the HIWAC is to retain water in the formed dough piece as temperature is increasing during frying to gelatinize the raw starch present in the dough at the time the dough piece reaches the gelatinization temperature. The HIWAC thus expands to establish the porous structure of the fried snack, and essentially holds the dough ingredients together during expansion in the fryer. The HIWAC is selected from one or more ingredients comprising pregelatinized (precooked) cereal flours or starches, dehydrated potatoes, or any other dry, particulate, highly water-absorptive (as defined herein), precooked, low-fiber food ingredient capable of expanding and holding the dough ingredients together during frying. These functions of the HIWAC are best carried out by the ingredients selected from the group consisting of pregelatinized corn flour, pregelatinized corn starch, potato flakes, potato flour, potato granules, rice flour and mixtures thereof.

The low water absorbing cereal-based component, abbreviated herein as "LOWAC", consists of one or more raw or partially gelatinized dry-milled cereal flours with substantially lower water-holding ability (water absorption) than the HIWAC, wherein the water absorption is measured over the range from room temperature to the gelatinization temperature of the ingredients. The LOWAC provides the flavor and fiber constituents for the snack, but it typically does not, in and of itself, hold water sufficiently to form a dough that can be used on a commercial basis for making fried snacks. Most generally, the LOWAC is present in the formulation from about 20% to about 80%, by weight, of the total dry solids present in the dough. Optimum results are obtained when the LOWAC is present from about 45% to about 70%, by weight, of the total dry solids. When combined with the HIWAC and mixed with the desired amount of raw starch and water, a smooth, cohesive dough of uniform composition is formed. This dough can be conveniently shaped by conventional sheeting equipment. The LOWAC ingredients have been subjected to minimum gelatinization (they are either raw or only partially gelatinized) and therefore most of the starch in the LOWAC can absorb more water if more water is present at the time the ingredients reach the gelatinization temperature. The HIWAC, being present in the dough with its higher water absorbing ability at the time the gelatinization temperature is reached, retains sufficient water to be available for absorption by the LOWAC at the gelatinization point. This allows the dough to expand during gelatination and form a uniformly porous structure throughout the snack. The LOWAC can be provided, at least in part, by a raw flour, such as corn flour, in which raw starch is available to gelatinize when the dough is fried and thus assist in forming the desired uniform porosity of the finished fried snack. LOWAC flours also can be prepared from steam-rolled or extruded grains that are partially gelatinized, but have a low water absorption, such as wheat (bulgur) flour, oat flour, barley flour, and mixtures thereof. Soy flour, rye flour, and rye flakes also can be used as a LOWAC ingredient. Particularly significant cereal flours for use in making fried snacks are partially gelatinized whole corn flours, such as those made by the process of Wimmer, U.S. Pat. No. 3,404,986, or Stickle, U.S. Pat. No. 4,089,259, in addition to dried masa flours prepared from lime-treated whole corn.

Many factors influence the ability of a dry particulate foodstuff, such as a cereal flour or starch, to absorb or "hold" water at room temperature. Extremely fine particles of a raw starch entrap a small amount of water only by surface tension adsorption, but this small amount of water is loosely held at room temperature. Flours, such as wheat flour and oat flour, can absorb water by hydration of the undenatured proteins and other non-starch components. However, the same starch molecules can absorb many times their weight in water during gelatinization (at higher temperatures). The temperature at which a cereal flour in contact with an excess of water exhibits a rapid increase in viscosity during heating (gelatinization) is determined by the nature of the starch. That is, different cereal grains have different gelatinization temperatures and higher viscosity, which is directly proportional to greater water holding ability. For cereal grains, the starches normally gelatinize over the range of 50° to 75° C.

The water-absorbing (or viscosity) characteristics of four classes of ingredients used in this process can be accurately measured by an instrument such as the VISCO/amylo/GRAPH by C. W. Brabender Instruments, Inc. This is a fully recording instrument for measuring and recording apparent vicosity at constantly varying temperatures. A suspended sensing element immersed in the material under test is connected through a measuring spindle to a sensitive recording system. For gelation studies, a thermoregulator controls the temperature which is programmed to increase at the rate of 1.5° C. per minute from 25° C. to 95° C.

The drawing shows Brabender curves, measured in Brabender units of viscosity versus cooking time, determined for four exemplary materials, using a mixture of nine parts water to one part solids (moisture-free basis), or 10% solids. These examples illustrate the water absorbing characteristics of the four classes of food ingredients used in this process; and as shown in the drawing, each class of food ingredients has a different viscosity (or water-absorbing ability) as cooking time (and temperature) increases. The four classes of food ingredients illustrated in the drawing are:

A. Example of a high water-absorption component (HIWAC), pregelatinized corn flour, Table 1, No. 3 below;

B. Example of low water-absorption cereal flour (LOWAC), partially gelatinized whole corn flour, Table 2, No. 5, below;

C. Example of a LOWAC, raw corn flour, Table 2, No. 13, below; and

D. Example of raw starch, amioca starch.

As illustrated in the drawing, highly gelatinized or HIWAC ingredients (A) have a higher initial viscosity which diminishes as the product is stirred and heated due to the physical breakdown of the gel as a result of the continued mixing. This is followed, in most cases, by a slight increase in apparent viscosity at the gelatinization temperature as the starch molecules absorb a final increment of water. The HIWAC contains very little raw starch but does exhibit some increase in viscosity when heated above the gelatinization temperature, which, in the drawing, is at about 28 minutes cooking time.

Partially gelatinized LOWAC cereal flours (B), including those of major interest in producing the novel snacks of this process, exhibit a relatively low viscosity on initial mixing, followed by a moderate increase in viscosity as the raw starch contained in the particles reaches the gelatinization temperature. Raw cereal flours (C) also exhibit a relatively low viscosity at low temperatures, followed by a more rapid increase in viscosity as the starch reaches the gelatinization temperature.

Raw cereal starches (D) show the most rapid increase in viscosity on gelatinization. The rate of increase of viscosity is highest in this class of ingredients, since the pure starches have been thoroughly separated from the other components of the cereal grains and thus can absorb water and swell without restriction.

Thus, the HIWAC provides a greater water-absorbing capability than the LOWAC or the raw starch during frying until the dough reaches the gelatinization temperature. At that point, the raw starch and the raw flour, and to some extent the pregelatinized flour, absorb the water retained by the HIWAC and become gelatinized sufficiently to expand and form a porous snack structure.

I have discovered that prior attempts to utilize ungelatinized or partially gelatinized cereal flours for the preparation of fried expanded snacks have been limited by the tendency of dough pieces formed from these ingredients to lose water too quickly during frying. If the evolution of water during frying dehydrates the dough piece at too rapid a rate, by the time the internal temperature of the piece reaches the gelatinization temperature of the starch, insufficient water remains in the dough piece to permit the remaining starch to absorb the water and encapsulate the steam-filled voids within the dough piece to form the desired snack structure. However, I have discovered that the HIWAC present in the dough during frying significantly slows the evolution of water from the formed dough piece after it is deposited in the frying fat. This retains sufficient water in the dough piece to hydrate the residual ungelatinized starch in the dough piece at the time it reaches the gelatinization temperature, forming a well expanded and uniformly porous fried snack.

If certain LOWAC ingredients are present in a high enough quantity in the dough, together with a very highly water-absorbent HIWAC, it may be possible that no additional raw starch would be required for forming the desired snack product, defined herein as a well-expanded (expansion ratio of about 1.4 to 2.5-to-1), non-brittle, uniformly porous, fried piece with acceptable fat content (less than about 30%). However, most LOWAC cereal flours do not exhibit sufficient raw starch binding power (as exhibited by a rapid increase in viscosity during gelatinization) to form the desired structure. Raw starches, in contrast, absorb water quckly from the formed dough piece as internal temperature rises rapidly to its gelatinization temperature. The affinity for water of the gelatinizing starches is so great that the bubbles of steam formed from the evaporation of water become entrapped uniformly throughout the dough piece in a network of firm starch gel which creates the uniformly porous structure of the finished fried snack.

For this reason, it is particularly advantageous that a portion of the dry starch-containing solids in the dough be in the form of a pure raw starch, most generally in the amount from about 10% to about 45%, by weight of the total dry solids present in the dough. Optimum results are obtained when the starch is present from about 15% to about 30%. Corn, potato, tapioca, and amioca starch, or mixtures thereof, have been found acceptable raw starches for these snack products; but any pure starch or modified starch exhibiting a rapid increase in viscosity on gelatinization, including some LOWAC raw flours, can be satisfactory. Starches do not brown during frying as do ingredients containing sugars or proteins; hence, their presence in the formulation is useful in reducing the tendency of the snack products to scorch when fried. Another advantage of using a raw starch in the dough is the reduction of overall viscosity or cohesiveness of the dough, which facilitates extrusion at more desirable lower pressures.

I have discovered that it is possible to use a simple measurement of water-holding ability or absorption of snack ingredients to classify them as the HIWAC ingredients capable of forming a workable snack dough when combined with the appropriate quantity of the cereal-based LOWAC ingredients and the raw starch.

The dilution used in the Brabender method (9:1) is too great for differentiating the initial room temperaturea absorption of these ingredients. Instead, if the quantity of water is reduced to 4:1, based on the weight of the ingredient at its normal moisture content, a modification of the widely-used Bostwick method can be used for differentiating the water absorption of the HIWAC from the LOWAC ingredients. Generally, this method consists of making a water slurry of the flour to be tested, placing a given quantity of the flour in an open-bottom container on a flat surface, removing the container, and, in a selected period of time, measuring the diameter of the resulting mass. The method, as modified for ingredients used in this process, is as follows:

Place 400 ml. of water at 25° C. in an 800 ml. glass beaker. Gradually add 100 gm. of the flour while stirring vigorously with a wooden-handled spatula with a 5 in. steel blade. Then stir gently for 3 min., using a spatula to smooth any lumps that may form. Mixing may be done using a Hobart Model N-50 blender, slow speed, or equipment giving equivalent results. Allow the slurry to stand an additional 2 min. for hydration. Then stir gently for about 1 sec. with the spatula, using the Hobart blender, for example. Place a 45×45 cm. glass plate over a paper measuring scale and center a 7.25 cm.-diameter (internal), open-bottom, cylindrical container, exactly 7.5 cm. high, over the scale. Transfer the slurry to the container which is resting the vertical position on the flat glass plate. Transfer the slurry until the container is filled higher than its top level. Strike off the excess with a straight edge. Allow the slurry to rest for 30 sec. as a patty forms on the glass plate. Then remove the container from the glass plate with a vertical pull, avoiding lateral motion. Allow any remaining contents of the container to drain onto the patty for 10 sec. After waiting 1 min. for the size of the patty to reach equilibrium, read its diameter to the nearest millimeter, as shown on the scaled measuring sheet underneath the glass plate.

The results of these tests, referred to herein as the Modified Bostwick Index (M.B.I.), for high water-absorption components that can be used in the dough, are presented in Table 1 below, in which the index is expressed in centimeters.

TABLE 1

MODIFIED BOSTWICK INDEX
FOR INGREDIENTS WITH HIGH WATER ABSORPTION
(HIWAC)

| No. | Ingredient | Cm. |
|---|---|---|
| 1 | Corn Flour, Precooked No. 1 (ICM 820)* | 8.0 |
| 2 | Corn Flour, Precooked No. 2 (ICM 965)* | 12.0 |

TABLE 1-continued
MODIFIED BOSTWICK INDEX FOR INGREDIENTS WITH HIGH WATER ABSORPTION (HIWAC)

| No. | Ingredient | Cm. |
|---|---|---|
| 3 | Corn Flour, Precooked No. 3 (ICM 875)* | 8.3 |
| 4 | Corn Starch (pregelled) (American Maize 721A) | 11.0 |
| 5 | Potato Flakes (20-mesh) | 8.5 |
| 6 | Potato Flour (80-mesh) | 8.0 |
| 7 | Potato Granules (normal absorption)** | 10.0 |
| 8 | Rice Flour (Instant Rice Flour-40) | 10.5 |

*ICM - Illinois Cereal Mills
**AMPCO - American Potato Co.

The Modified Bostwick Index for typical cereal-based low water-absorbing components are presented in Table 2 below.

TABLE 2
MODIFIED BOSTWICK INDEX FOR CEREAL INGREDIENTS WITH LOW WATER ABSORPTION (LOWAC)

| No. | Ingredient | Cm. |
|---|---|---|
| 1 | Barley Flour (Pregel.) (Minnesota Grain Pearling Co.) | 34.0 |
| 2 | Bulgur Flour (20-mesh) (California Milling Corp.) | 26.5 |
| 3 | Bulgur Flour (20-mesh) (Fisher Ala) | 29.0 |
| 4 | Bulgur Flour (60-mesh) (Lauhoff) | 22.0 |
| 5 | Bulgur Cracked (16-mesh) | 35.0 |
| 6 | Corn Flour, whole, No. 1 (Krause PCM) | 28.5 |
| 7 | Corn Flour, whole, No. 2 (Mountain Milling) | 45.0+ |
| 8 | Corn Flour, whole, No. 3 (Mountain Milling) | 26.0 |
| 9 | Corn Flour, whole, No. 4 (Mountain Milling) | 40.6 |
| 10 | Corn Flour, Masa, No. 1 (Valley Grain No. 7) | 36.0 |
| 11 | Corn Flour, Masa, No. 2 (Valley Grain No. 2) | 33.5 |
| 12 | Corn Flour, Masa, No. 3 (Maseca No. 6) | 38.5 |
| 13 | Corn Flour, Masa, No. 4 (Maseca white) | 26.0 |
| 14 | Corn Flour, raw (ICM 505) | 45.0+ |
| 15 | Oat Flour (Quaker) | 33.0 |
| 16 | Rye Flakes (Conagra rolled rye (Fruen Milling Co.) | 25.0 |
| 17 | Rye Flour (Fisher | 33.0 |
| 18 | Soy Flour (Soya Rich & Soya Fluff (Central Soya) | 29.5 |
| 19 | Soy Flour (Staley F-200) | 33.0 |
| 20 | Soy Flour (Staley I-200) | 25.0 |
| 21 | Cracked Wheat, All-O-Wheat | 45.0+ |
| 22 | Rolled Wheat, All-O-Wheat | 45.0+ |

Some ungelatinized or raw cereal flours do not absorb the water in this test, since the water spreads completely over the glass. Any flour or starch with a reading over about 45 cm. may be classified as an extremely LOWAC raw flour or as a raw starch for the purpose of this process.

By combining (1) about 10% to 35% of the HIWAC ingredients shown in Table 1 with (2) about 20% to 80% of the less absorptive LOWAC ingredients shown in Table 2 and (3) about 10% to 45% raw starch, a dough can be formed with about 35% to 50% water that can be easily sheeted and cut into small portions, which, when fried, immediately thereafter produce uniformly expanded snack products with a highly desirable texture and flavor. The HIWAC ingredients are those having an M.B.I. of less than about 15 cm., normally about 12 cm. or less. The LOWAC ingredients are those having an M.B.I. higher than about 20 cm., normally above 25 cm.

When the dough pieces are fried they produce uniformly expanded snack products with a highly desirable texture and flavor. The 35% to 50% water content is based on the weight of the dough. The quantity of water added to the formula to achieve the consistency desired for the dough and the type and degree of mixing employed is dependent on the net absorption of the total dry ingredients and the type of extrusion process being used. The quantity of water added can be adjusted by those skilled in the art to provide optimum forming production rate and product quality.

Other methods of absorption measurement for the cereal flours also can be adopted by those skilled in the art, such as a Brookfield viscosimeter fitted with a heli-path stand. However, the Modified Bostwick method has been found to be quite reproducible and is well adapted for routine measurement by laboratory and plant personnel evaluating ingredients for snack production.

Other features of the process will be evident from the more detailed discussion of the following examples of the process.

Corn-Based Snacks

In one practice of this invention, novel fried corn-based snacks are made from dry corn-based solids in which one or more whole, non-lime-treated corn flours constitute the major portion of the dry solids in the dough. Generally, the whole corn flour used for making this snack has the full characteristic corn flavor desirable in the finished corn snack product. In another practice of the invention, novel fried corn-based snacks are made from dry corn-based solids that include masa flour. It is desirable that the corn-based solids constitute a major portion (at least more than 50%) of the dry solids in the dough, to provide the desired full corn flavor.

Use of Expansion Ratio

The degree to which a formed piece of dough expands during frying is one of the most important quality measurements. Products exhibiting low expansion generally have a hard, brittle texture owing to the absence of small spaces or voids throughout the product. The most desirable snack structure is one that has a more uniform network of honeycombed uniformly sized voids throughout its cross section. Snacks that expand greatly during frying generally tend to exhibit a non-uniform structure characterized by large bubbled areas. It is thought that these large internal voids occur during frying as a result of the disintegration of the internal structure. In this process the excessive puffing is especially noted when the formulation has insufficient raw starch or excess HIWAC ingredient in the formulation.

During the manufacture of any sheeted product, there is a relationship between the aperture between the rotating sheeting rolls to the thickness of the dough after passing through such rollers. The expansion ratio referred to herein is defined as the average thickness of the finished fried product divided by the thickness of the dough after sheeting, rather than the aperture of the sheeting rolls. This basis was selected after the analysis of a large number of experiments clearly showed that the factor most exactly associated with snack texture is the ratio between the finished product and dough thickness. Other factors can greatly alter the tendency of the dough to expand or not expand after passing through the sheeting rolls, such as the dough moisture content, degree of mixing, presence of particulate matter and the like. Measurements between such rotating sheeting rolls are difficult to maintain and subject to inaccuracies due to the movement of rollers during sheeting.

As expressed herein, expansion of corn and cereal-based snacks within the range of 1.4 to 2.5 results in the most desirable texture and appearance for such products. Many judgments by a trained taste panel and consumers have been used to substantiate these ranges as well.

EXAMPLE 1

In a laboratory preparation of a corn snack including a whole grain non-limed corn ingredient, dry ingredients were blended in the following proportions:

| Ingredient | Type | Wt. % | TOTALS Type | % |
|---|---|---|---|---|
| Whole corn flour (1) | LOWAC | 47.4 | HIWAC | 17.1 |
| Pregel. corn flour (2) | HIWAC | 17.1 | LOWAC | 57.4 |
| Amioca starch | Starch | 15.2 | Starch | 23.5 |
| Cracked wheat | LOWAC | 10.0 | | |
| Corn starch | Starch | 8.3 | | |
| Salt | | 2.0 | | |
| Water, % of dry ingredients, 66.7% | | | | |
| Dough moisture, 43.1% | | | | |

300 gm of the dry mix were combined and mixed with 200 gm of water in the Hobart A-50 mixer for three minutes, using the dough hook. The dough was sheeted in a Rondo Model 1-500 hand-operated sheeter to a final thickness of about 1.0 mm using five successive passes of decreasing thickness. The sheeted dough was cut into rectangular pieces measuring about 2×6 cm and fried at about 175° C. for 60 seconds. The product had a uniform porosity, a full corn flavor and expanded uniformly to an average thickness of 1.54 mm. Expansion ratio was 1.54.

EXAMPLE 2

Sheeted non-limed corn snacks were prepared in a continuous pilot plant test from the formulation of Example 1 using conventional tortilla chip equipment. 3,000 gm of dry mix were combined with 2,000 ml cold water in a Model A200 Hobart bowl mixer fitted with a dough hook. With the mixer on speed No. 2, (198 rpm), the water was added during a period of 11 seconds and the dough was formed into a cohesive single ball in 55 seconds. The mixing was concluded with a dough hook on speed No. 1 in three mintues. The dough ball was flattened by the hand-operated Rondo to form an elongated strip about 1.5 cm thick and 30 cm wide. The thick, flattened strip of dough was fed to the nip of a conventional tortilla chip sheeter manufactured by Electra Food & Machinery Corporation, Model HTO-17. This sheeter had rolls 16.5 cm in diameter and 60.6 cm wide. The rotating die cutter held against the second roller subdivided the sheet into hexagonal chips 5 cm wide. The dough pieces were sprayed lightly on both sides with a fine water mist and fried in a continuous Belshaw doughnut fryer maintained at 175° C. for 60 seconds. The product was drained, cooled, and seasoned and found to have a light, tender texture, a somewhat bland neutral sweet flavor, and uniform porosity throughout. The thickness of the dough sheet was monitored during subsequent runs and found to average 1.05 mm. The product expanded during frying to an average thickness of 1.58 mm. The expansion ratio, defined as the thickness of the finished fried product divided by the thickness of the extruded sheet, was 1.50.

EXAMPLE 3

A limed corn masa flour was obtained, known as Valley Grain Tortilla Flour No. 7. 3,000 gm of this flour were mixed with 2,000 gm of water and the dough was sheeted as described in Example 2 in the EFM tortilla chip sheeter. A second test was made in which the whole non-limed corn flour in the formula of Example 2 was replaced by the masa flour, which was mixed with the same dry ingredients and water to form a dough similar to that used in Example 2. Both products were fried under the same conditions and were later examined with the results shown below.

| Ingredients | Test A | Test B |
|---|---|---|
| Masa flour, LOWAC No. 9 | 100% | 47.4% |
| Pregel. corn flour, HIWAC No. 2 | — | 17.1% |
| Amioca starch | — | 15.2% |
| Cracked wheat | — | 10.0% |
| Corn starch | — | 8.5% |
| Salt | — | 2.0% |
| Totals: | | |
| LOWAC | 100 | 57.4 |
| HIWAC | — | 17.1 |
| Starch | — | 23.7 |
| Thickness, mm | | |
| Dough sheet | 1.2 mm | 1.14 mm |
| Product | 1.56 mm | 2.22 mm |
| Exapansion ratio | 1.39 | 1.95 |
| Exapansion ratio | 1.39 | 1.95 |
| Fat content | 35.5% | 23.5% |
| Appearance | Glassy, not porous, greasy, dark | Uniformly porous, light |
| Texture | Hard, brittle | Crisp, crunchy |
| Flavor | Strong, harsh Mexican food. flavor | Clean, rounded corn flavor, mildly typical of Mexican food |

Example 4

Pilot plant tests were made to measure the effect of the quantity of water added on the consistency of the dough and quality of the finished product. 20-pound batches of the blended ingredients shown below were mixed with water at 70° F. at a level of from 50% to 85% of the weight of total blended dry ingredients.

| Ingredient | Type | Wt. % | TOTALS Type | % |
|---|---|---|---|---|
| Whole corn flour (1) | LOWAC | 45.58 | HIWAC | 17.25 |
| Pregel. corn flour (2) | HIWAC | 17.25 | LOWAC | 55.58 |
| Amioca starch | Starch | 15.35 | Starch | 23.80 |
| Corn starch | Starch | 8.46 | | |
| Cracked wheat | LOWAC | 10.0 | | |
| Salt | | 1.0 | | |
| Oil | | 1.0 | | |
| Lecithin | | 0.15 | | |
| Sugar | | 1.0 | | |
| Seasoning | | 0.22 | | |

The water and dry ingredients were mixed for 30 seconds at speed No. 1 in a 60-quart Hobart mixer and from 1.25 to 5 minutes at speed No. 2, all with the dough hook. Previous experience had shown it desirable to mix the dough until a cohesive but non-sticky dough results; the required time decreased as the amount of water was increased. The dough was held at room temperature for 15 minutes before sheeting in the EFM tortilla chip sheeter fitted with a cutter designed to give 4 cm wide hexagons. The sheet was fed by hand into the nip of the rolls which turned at 2 rpm and were slightly lubricated with a mixture of oil/lecithin at a ratio of 9 to 1. The cut pieces were sprayed on both sides with a light mist of water and fried at 350° F. for periods ranging from 62 to 152 seconds. The results are tabulated below:

| Sample | A | B | C | D | E | F |
|---|---|---|---|---|---|---|
| Water (%) of dry ingre. | 50.0 | 55.0 | 66.7 | 75.0 | 80.0 | 85.0 |
| Dough moisture (%) | 37.2 | 39.1 | 43.1 | 45.7 | 47.1 | 48.5 |
| Sheet thickness (mm) | 0.94 | 0.97 | 0.93 | 0.94 | 0.98 | 0.97 |
| Finished thickness (mm) | 1.56 | 1.68 | 1.76 | 2.38 | 2.27 | 2.19 |
| Expansion ratio | 1.66 | 1.73 | 1.89 | 2.53 | 2.32 | 2.26 |
| Mixing time (minutes) | 5 | 3 | 3 | 3 | 1.5. | 1.25 |
| Fry time (seconds) | 64 | 62 | 71 | 80 | 95 | 152 |
| Fat content (%) | 26.2 | 28.0 | 28.6 | 27.0 | 29.4 | 30.3 |
| Comments on dough | (a) | (b) | (c) | (d) | (e) | (f) |

(a) Dough very stiff, could not be fed to sheeter without subdividing.
(b) Also stiff as above.
(c) Good cohesive dough, easily accepted by sheeter, best of series.
(d) Slightly sticky after mixing but, after holding, good cohesive dough.
(e) Very sticky dough as mixed, could be handled after holding period, stuck to mixer.
(f) Extremely sticky dough that stuck to mixer but made acceptable product after holding for equilibration.

Acceptable products were made at all levels of water addition, although the preferred range of 40 to 45% moisture had optimum quality and minimum problems of mixing and handling. It was concluded that larger bakery type sheeting rolls could easily process the dough of Sample A, although, by reducing the water below this level, the product's lower expansion would produce a thin crisp, but not as tender product as those made within the optimum range.

EXAMPLE 5

The procedure of Example 4 was used to illustrate the effect of adding a HIWAC ingredient, a raw starch and a raw cereal flour in order, to a non-limed corn flour to make fried sheeted snack products. To facilitate control of expansion, a quantity of cracked wheat was added to each formula in the amount necessary to achieve optimum quality. This ingredient was included as a LOWAC ingredient.

All ingredients were combined with 65% relative water to give a calculated dough moisture of 45%, which had been determined earlier to be optimum for this process. Mixing, sheeting and frying were substantially the same as in Example 4, except that the frying time at 350° F. was carefully measured during the experiment for each sample. The finished product was evaluated for quality and expansion. The percentage increase in frying time of samples B, C, and D over Sample A was determined by dividing the additional seconds required for frying by the frying time for Sample A, or 66 seconds.

The results are tabulated below.

| Sample | A | B | C | D |
|---|---|---|---|---|
| LOWAC, No. 5, Whole corn flour (%) | 87 | 65 | 45 | 45 |
| LOWAC, No. , Cracked wheat (%) | 13 | 13 | 10.0 | 10 |
| LOWAC, No. 13, Raw corn flour (%) | — | — | — | 22.5 |
| HIWAC, No. 2, Pregel. corn flour (%) | — | 22 | 22.5 | 22.5 |
| Starch, Amioca | — | — | 22.5 | — |
| Totals: | | | | |

| Sample | A | B | C | D |
|---|---|---|---|---|
| LOWAC | 100 | 78 | 55 | 77.5 |
| HIWAC | 0 | 22 | 22.5 | 22.5 |
| Starch | 0 | 0 | 22.5 | 0 |
| Fry time (seconds) | 66 | 81 | 90 | 75 |
| Fry time (% increase v A) | — | 23 | 36 | 14 |
| Expansion ratio | | 1.46 | 1.58 | 1.65 | 1.39 |

The results conclusively show that by extending the frying with the addition of the HIWAC ingredient and by adding raw starch as in Sample C, the expansion, and the quality of the finished product were greatly improved. Adding the raw corn flour in sample D did not achieve the desired results since the corn starch present in the corn flour was not as available to absorb the water in the dough piece during frying, as were the raw starch particles.

Similar experiments were conducted with the same dough compositions mixed with a range of moisture contents from 40% to 50% with substantially similar results.

EXAMPLE 6

A combination of cereal ingredients designed to give 50% whole grain constituents was processed as described in Example 4.

| Ingredient | Type | Lot % | Type | % |
|---|---|---|---|---|
| Whole corn flour No. 2 | LOWAC | 12.0 | LOWAC | 55.7 |
| Precooked corn flour No. 2 | HIWAC | 16.95 | HIWAC | 16.95 |
| Cracked wheat | LOWAC | 15.0 | Starch | 24.0 |
| Amioca starch | Starch | 12.0 | | |
| Corn starch | Starch | 12.0 | | |
| Bulgur flour | LOWAC | 5.7 | | |
| Oat flour | LOWAC | 5.0 | | |
| Rolled wheat | LOWAC | 5.0 | | |
| Oil | | 1.0 | | |
| Flavoring | | 0.2 | | |
| Lecithin | | 0.15 | | |

The sheeted products were cut into hexagons, sprayed lightly with water to reduce puffing, and fried at 350° F. for 53 seconds. The finished products had 27.8% fat, an expansion ratio of 1.76, and excellent shape and texture, with a natural wholesome whole grain appearance and flavor.

I claim:
1. A method for making a sheeted expanded fired cereal-based snack product, comprising the steps of: preparing a dough consisting essentially of:
   (a) a low water-absorbing component comprising one or more raw or partially gelatinized cereal flours comprising from about 20% to about 80%, by weight, of the total solids contained in the dough;
   (b) a high water-absorbing component comprising one or more pregelatinized cereal starches or flours or dehydrated potatoes comprising from about 10% to about 35%, by weight, of the total solids in the dough;
   (c) a starch component comprising one or more extraneously added ungelatinized starches comprising from about 10% to about 45%, by weight, of the total solids; and
   (d) water mixed with the solids to form a dough in which the moisture content of the dough is from about 35% to about 50%, by weight, of the dough;

sheeting the dough and cutting a dough piece from the dough; and frying the dough piece in hot cooking oil to form an expanded fried snack product, the dough pieces containing said amounts of the components (a), (b), and (c) and having said 35% to 50% moisture content at the time of frying, the dough piece at the time of frying also containing residual raw starch provided by said amounts of components (a) and (c), component (b) having a substantially greater ability td hold water than component (a) throughout the frying step up until the gelatinization temperature of said residual raw starch is reached, thereby retaining water present in the dough piece sufficiently to combine with said residual raw starch at said gelatinization temperature to cause the residual raw starch to gelatinize and form an expanded fried snack of substantially uniform porosity throughout its cross-section with an expansion from about 1.4 to about 2.5 times the original thickness of the sheeted and cut dough pieces.

2. The method according to claim 1 in which component (a) has an M.B.I. of more than about 20 cm., and component (b) has an M.B.I. of less than about 15 cm.

3. The method according to claim 2, in which component (a) is selected from the group consisting of whole corn flour, masa flour, corn flour, barley flour, bulgur flour, cracked bulgur, oat flour, rye flakes, rye flour, soy flour, and mixtures thereof.

4. The method according to claim 3, in which component (b) is selected from the group consisting of pregelatinized corn flour, pregelatinized corn starch, potato flakes, potato flour, potato granules, rice flour, and mixtures thereof.

5. The method according to claim 4, in which the starch component is selected from the group consisting of corn starch, potato starch, tapioca starch, amioca starch, and mixtures thereof.

6. The method according to claim 1, in which component (a) is present from about 45% to about 70% of the dry solids, component (b) is present from about 15% to about 25% of the dry solids, and component (c) is present from about 15% to about 30% of the dry solids.

7. The method according to claim 1, in which the moisture content of the dough is from about 40% to about 45%, by weight of the dough.

8. The method according to claim 1 in which the amount of raw starch contained in the dough is substantially unchanged from the sheeting step to the frying step.

9. The method according to claim 1 including sheeting the dough by roller forming the dough to substantially avoid gelatinization of the residual starch contained in the dough during the sheeting step.

10. The method according to claim 1 in which the amount of component (a) contained in the dough at the time of frying is greater than the amount of component (b).

11. A method for making a sheeted expanded fried corn snack product comprising the steps of:
preparing a dough consisting essentially of:
 (a) a low water-absorbing component comprising one or nore raw or partially gelatinized corn flours selected from the group consisting of whole corn flour and corn flour and comprising from about 20% to about 80%, by weight, of the total solids contained in the dough;
 (b) a high water-absorbing component comprising one or more pregelatinized cereal starches or flours or dehydrated potatoes comprising from about 10% to about 35%, by weight, of the total solids in the dough;
 (c) a starch component comprising one or more extraneously added ungelatinized starches comprising from about 10% to about 45%, by weight, of the total solids; and
 (d) water mixed with the solids to form a dough having a moisture content of about 35% to about 50% by weight of the dough;
sheeting the dough and cutting a dough piece from the dough; and
frying the dough piece in hot cooking oil to form an expanded fried snack product, the dough piece containing said amounts of the components (a), (b) and (c) and having said 35% to 50% moisture content at the time of frying, the dough piece at the time of frying also containing residual raw starch provided by said amounts of components (a) and (c), component (b) having a substantially greater ability to hold water than component (a) throughout the frying step up until the gelatinization temperature of said residual raw starch is reached, thereby retaining water present in the dough piece sufficiently to combine with said residual raw starch at said gelatinization temperature to cause the residual raw starch to gelatinize and form an expanded fried snack of substantially uniform porosity throughout its cross section with an expansion from about 1.4 to about 2.5 times the original thickness of the sheeted and cut dough piece.

12. The method according to claim 11, in which component (b) is selected from the group consisting of pregelatinized corn flour, pregelatinized corn starch, and mixtures thereof.

13. The method according to claim 11, in which component (a) is present from about 45% to about 70% of the dry solids, component (b) is present from about 15% to about 25% of the dry solids, and component (c) is present from about 15% to about 30% of the dry solids.

14. The method according to claim 11, in which component (a) has an M.B.I. of more than about 20 cm., and component (b) has an M.B.I. of less than about 15 cm.

15. The method according to claim 11, in which the moisture content of the dough is from about 40% to about 45%, by weight of the dough.

16. The method according to claim 11 in which the amount of raw starch contained in the dough is substantially unchanged from the sheeting step to the frying step.

17. The method according to claim 11 including sheeting the dough by roller forming the dough to substantially avoid gelatinization of the residual starch contained in the dough during the sheeting step.

18. The method according to claim 11 in which the amount of component (a) contained in the dough at the time of frying is greater than the amount of component (b).

19. A method for making a sheeted expanded fried cereal-based snack product, comprising the steps of:
preparing a dough from solids consisting essentially of:
 (a) a low water-abosrbing component comprising one or more raw or partially gelatinized cereal flours comprising from about 45% to about 70% of the solids contained in the dough;
 (b) a high water-absorbing component comprising one or more pregelatinized cereal starches or flours or dehydrated potatoes comprising from about 15% to about 25%, by weight, of the total solids in the dough;

(c) a starch component comprising one or more extraneously added ungelatinized starches comprising from about 15% to about 30%, by weight, of the total solids in the dough; and (d) water mixed with the solids to form a dough in which the moisture content of the dough is from about 35% to about 50%, by weight, of the dough;

roller forming the dough into sheet form and cutting a dough piece from the sheeted dough; and frying the dough piece in hot cooking oil to form an expanded fried snack product, the dough piece containing said amounts of the components (a), (b) and (c) and having said 35% to 50% moisture content at the time of frying, the dough piece at the time of frying also containing residual raw starch provided by said amounts of components (a) and (c), component (b) having a substantially greater ability to hold water than component (a) throughout the frying step up until the gelatinization temperature of said residual raw starch is reached, thereby retaining water present in the dough piece sufficiently to combine with said residual raw starch at said gelatinization temperature to cause the residual raw starch to gelatinize and form an expanded fried snack of substantially uniform porosity throughout its cross section with an expansion from about 1.4 to about 2.5 times the original thickness of the sheeted and cut dough piece.

20. The method according to claim 19 in which component (a) has an M.B.I. of more than about 20 cm, and component (b) has an M.B.I. of about less than 15 cm.

21. A method for making a sheeted expanded fried cereal-based snack product, comprising the steps of:

preparing a dough from a solids consisting essentially of:

(a) a low water-absorbing component comprising fine particulate whole grain cereal solids selected from the group consisting of corn, wheat, barley, oats, rye and soy, in which the starch contained in the low water-absorbing component is raw or partially gelatinized and comprises from about 20% to about 80%, by weight, of the total solids contained in the dough;

(b) a high water-absorbing component comprising one or more pregelatinized cereal starches or flours or dehydrated potatoes comprising from about 10% to about 35%, by weight, of the total solids in the dough;

(c) a starch component comprising one or more extraneously added ungelatinized starches comprising from about 10% to about 45%, by weight, of the total solids in the dough; and (d) water mixed with the solids to form a dough in which the moisture content of the dough is from about 35% to about 50%, by weight, of the dough;

sheeting the dough to form a dough sheet while substantially avoiding gelatinization of residual raw starch contained in the dough piece during the sheeting step;

cutting a dough piece from the sheeted dough; and frying the dough piece in hot cooking oil to form an expanded fried snack product, the dough piece containing said amounts of the components (a), (b) and (c) and having said 35% to 50% moisture content at the time of frying, the dough piece at the time of frying also containing residual raw starch provided by said amounts of components (a) and (c), component (b) having a substantially greater ability to hold water than component (a) throughout the frying step up until the gelatinization temperature of said residual raw starch is reached, thereby retaining water present in the dough piece sufficiently to combine with said residual raw starch at said gelatinization temperature to cause the residual raw starch to gelatinize and form an expanded fried snack of substantially uniform porosity throughout its cross-section with an expansion from about 1.4 to about 2.5 times the original thickness of the sheeted and cut dough piece.

22. The method according to claim 21 in which the dough is sheeted by roller forming.

23. The method according to claim 21 in which the amount of component (a) contained in the dough at the time of frying is greater than the amount of component (b).

24. The method according to claim 21 in which component (a) has an M.B.I. of more than 20 cm, and component (b) has an M.B.I. of less than about 15 cm.

* * * * *